United States Patent Office 3,262,043
Patented July 19, 1966

3,262,043
ELECTRONIC PHOTOFLASH APPARATUS
Frank-Armin Heinrich, Berlin-Kreuzberg, Germany, assignor to Robert Bosch Elektronik G.m.b.H., Berlin-Wilmersdorf, Germany
Filed July 14, 1964, Ser. No. 382,608
Claims priority, application Germany, Aug. 8, 1963, B 73,049
20 Claims. (Cl. 320—1)

The present invention concerns an electronic photoflash apparatus which contains a discharge circuit including a gas discharge tube and a storage capacitor dischargeable across the gas discharge tube. More specifically, the invention concerns apparatus of the above mentioned type which also contains electric energy supply means including a battery, a self-oscillating transistor circuit, a transformer and rectifier means, particularly voltage doubler means including such rectifiers for charging the storage capacitor to a comparatively high direct current voltage, and which also include an auxiliary capacitor which is also charged by the direct current converter but independently of the storage capacitor and whose discharge causes the direct current converter to be rendered inoperative as soon as the storage capacitor and/or the auxiliary capacitor has been charged to a predetermined potential.

In an electronic photoflash apparatus it is desirable to conserve the (usually low voltage) battery by disconnecting or rendering inoperative the direct current converter as soon as the potential at the storage capacitor has reached a value which is required for operating the gas discharge tube. Of course, after a certain period of time the direct current converter must again be rendered operative in order to recharge the storage capacitor and in order to compensate for a drop of potential appearing at the storage capacitor due to leakage or other losses. For this reason several modifications of regulator circuits have been proposed and have been used in the past.

Generally a system has been adopted according to which a voltage divider is connected in parallel with the storage capacitor and which has a tap connected with a glow discharge lamp. The location of the tap of the voltage divider is so chosen that the glow discharge lamp ignites when the storage capacitor has reached the predetermined, upper critical potential of the lamp. The current flowing then through the glow discharge lamp circuit is used for disconnecting the direct voltage converter. As long as the potential at the storage capacitor is smaller than said predetermined value the current in the glow discharge lamp circuit is zero or anyway negligibly small. However, at the moment when the predetermined potential value is reached the current in the glow discharge lamp circuit surges suddenly to a comparatively high value and operates a switching device, for instance a relay, which then disconnects the direct voltage converter. On the other hand, when the potential at the storage capacitor drops slowly e.g. on account of losses, finally the potential will reach a value at which the glow lamp is extinguished so that the relay arranged in the glow lamp circuit will also drop off and the direct current converter will be started again to operate.

However, this known and conventional arrangement entails the great disadvantage that the moment of disconnection or inoperativeness of the direct current converter is never precisely defined on account of the unavoidable great variation of the critical parameters of the glow discharge lamps so that the potential that will be available at the storage capacitor is bound to vary greatly between different photoflash apparatus produced in a production set-up. However, this means that one has to expect that the gas discharge tube of one or the other apparatus would not furnish the predetermined and desired flash intensity with the result that the resulting photographic pictures are unsatisfactory due to incorrect exposure. The variations of the parameters of the glow discharge lamps are particularly inconvenient and detrimental because the glow discharge lamp is not supplied with the full potential of the storage capacitor but is usually supplied via a tap of the voltage divider, e.g. only with one third of the full potential of the storage capacitor. Therefore the variations of the parameters of the glow discharge lamps entail errors which have three times the value which they would have if the glow discharge lamps were supplied with the full potential of the storage capacitor.

For this reason it has been tried also to eliminate the glow discharge lamp entirely and to use directly the current available at the tap of the voltage divider connected in parallel with the storage capacitor, for regulating the circuit operation i.e. for disconnecting and reconnecting the direct current converter. However, in this case the difficulty ensues that the voltage divider must have a very high resistance in order not to create too high a load for the storage capacitor. Therefore the regulating current available at the tap of the voltage divider is extremely small and usually does not exceed the value of a few microamperes. Correspondingly small is also the variation of this regulating current corresponding to those potential values of the storage capacitor at which the direct current converter is intended to be switched off or switched on again, or in other words, corresponding to the upper and lower critical potential of the storage capacitor charge.

In order to be able to effect the connecting and disconnecting of the direct current converter by utilizing the above-mentioned very small differences between the values of the regulating current available at the tap of the voltage divider it is necessary to provide for a very substantial amplification of these small regulating currents and/or apply these currents to rather complicated relaxation oscillator circuits which are then supposed to produce the desired switching operations. These circuit arrangements are comparatively very involved and expensive. In addition, it has been found that even in this case the potential values or the moments at which the switching operations are to be effected cannot be predetermined with sufficient accuracy.

In order to avoid these difficulties it has been tried also to do away with taking off a regulating current from a high resistance voltage divider connected in parallel with the storage capacitor and to provide instead for an auxiliary capacitor which is charged with the alternating current of the direct current converter i.e. by the oscillator or oscillating transistor furnishing a certain alternating current. The required rectifier circuit for this auxiliary capacitor is independent of the rectifier arrangement associated with the charging of the storage capacitor. The voltage or the discharge current of the auxiliary capacitor is intended to effect the disconnection of the direct current converter as soon as a predetermined potential at the auxiliary capacitor is reached.

In doing this it is assumed that the auxiliary capacitor is charged at least approximately to the same degree as the storage capacitor, in other words that the potential and therefore the discharge current of the auxiliary capacitor assumes always the same predetermined value whenever the storage capacitor has reached a potential of predetermined magnitude. Now it is possible to construct the discharge circuit of the auxiliary capacitor in such a manner that the relay arranged in the discharge circuit thereof is energized and responds just when the potential or the discharge current of the auxiliary capacitor reaches the above-mentioned predetermined value. In this case the relay may close a switch contact upon its energization which renders inoperative the direct current converter e.g. by interrupting the connection between the direct current converter and the supplying battery.

However also this known arrangement is unsatisfactory for reasons which are unavoidable. The relay which is arranged in the discharge circuit of the auxiliary capacitor must remain energized as long as the direct current converter is to remain in inoperative condition. This means that the auxiliary capacitor must furnish a discharge current during this period of inoperativeness of the converter, the discharge current having a magnitude which suffices to hold the relay in energized condition. This condition can be met only if the auxiliary capacitor has a comparatively very large size and/or the relay has an extremely great sensitivity to small currents. Such a large capacitor however constitutes a very great load for the oscillating transistor of the converter so that the operativeness of the direct current converter is severely jeopardized and danger exists that the transistor would not even start oscillating upon closing of the respective circuit. On the other hand, a relay of very high sensitivity would not be reliable in arrangements of the type under consideration. In any case, it has been established in practice that this known arrangement is not reliable in operation and does not always operate satisfactorily.

It is therefore one object of this invention to provide for an electronic photoflash apparatus of the type set forth which is comparatively simple in construction and avoids all the disadvantages of the known apparatus.

It is another object of this invention to provide for an apparatus as mentioned above which is composed of a comparatively small number of conventional elements which do not comprise either large capacitors or highly sensitive relays so that the entire apparatus displays a great reliability and sturdiness.

With above objects in view the invention includes in an electronic photoflash apparatus with a discharge circuit including a gas discharge tube and a storage capacitor dischargeable across the gas discharge tube, in combination, electric energy supply means including direct current converter means furnishing in response to direct current energization an alternating voltage of predetermined elevated amplitude for charging the storage capacitor and comprising an oscillatory circuit with at least one controlling circuit portion therein for producing said alternating voltage depending upon the operativeness of said controlling circuit portion; and regulator circuit means for automatically interrupting the alternating voltage output of said direct current converter means when said storage capacitor is charged to a predetermined potential and including an auxiliary capacitor means connected with said direct current converter means for being charged thereby simultaneously with said storage capacitor, and discharge circuit means connected with said auxiliary capacitor means and including means for rendering said discharge circuit means conductive only when said auxiliary capacitor means is charged to a predetermined potential, said discharge circuit means being also operatively connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativeness of said converter means.

In order to obtain the best results and the full advantages that can be derived from the present invention it is of importance that the above-mentioned auxiliary capacitor means have a comparatively small capacity amounting to not more than ten $\mu f.$ and that the discharge circuit contains as a means for rendering this circuit conductive and non-conductive a glow discharge device which has a characteristic extinction potential lower than one-half of its characteristic igniting potential. The importance of these features will be understood if one bears in mind that the glow lamps which have been used up to now as components of regulator circuits in this field have an extinction potential which is much higher than one-half of the characteristic igniting potential so that the difference between these two potentials is comparatively very small.

A regulator circuit in an apparatus of the kind set forth is supposed to operate in such a manner that the potential at the storage capacitor is kept as much as possibly constant and this is done by keeping as small as possible the difference between the upper critical potential at the storage capacitor at which the glow discharge device ignites and disconnects the direct current converter, on one hand, and the lower critical potential, on the other hand, at which the glow discharge device is extinguished and the direct current converter starts again recharge the storage capacitor. The difference between the two critical potentials depends upon the way in which the potential at the storage capacitor gradually drops on account of current leakage which drop must not be influenced by any switching operation, and also upon the duration of the period of time during which the direct current converter is to be kept disconnected or inoperative.

This period of time must be made sufficiently long for various reasons, e.g. because the charging and discharging of the auxiliary capacitor necessitated in connection with each regulating operation consumes a certain amount of energy which must be supplied by the battery. However, while in known regulator circuits a sufficiently long duration of said period of time is achieved by using an auxiliary capacitor of large capacity because the critical igniting potential and the critical extinction potential of the conventionally used glow lamp are very close to each other, the invention provides in the arrangement a glow discharge device whose extinction potential is lower than one-half of its igniting potential which makes it possible to have in the circuit an auxiliary capacitor of very small capacity which type of capacitor is very much smaller and less expensive than the conventionally used large capacitors. The characteristics of the glow discharge device as pointed out permit the auxiliary capacitor of small capacity to discharge down to a much smaller potential value at which the glow discharge device is extinguished and in this manner the above-mentioned time period of holding the direct current converter inoperative becomes sufficiently long.

It has been found of particular advantage to place into the discharge circuit of the auxiliary capacitor a glow discharge device of the type known as voltage surge limiter in connection with a suitable series resistor. The known and successfully tested voltage surge limiter may be a device manufactured and sold at least since April 1961 by the German concern Siemens & Halske A.G. and listed in their catalog T Kg3 as item No. A1–A230. This device differs critically from conventional glow lamps because in these glow lamps the extinction potential is about ⅞ of its critical ignition potential, the above-mentioned device is characterized by having an extinction potential which amounts to only ¼ of its characteristic ignition potential. In connection with this particular device it has been found advisable to use an auxiliary capacitor which has a capacity of not more than five $\mu f.$, preferably only two $\mu f.$ It is also an advantageous feature of this particular type of voltage surge limiters that they have at the moment of ignition an internal resistance which is comparatively much smaller than that of the conventional glow lamps so that the current in the discharge circuit which contains this voltage surge limiter becomes comparatively large.

In a further development of the invention the current of the glow discharge device may be used for controlling the potential at the base of a transistor whose collector current is used for disconnecting or rendering inoperative the direct current converter as will be shown in greater detail in reference to the drawings illustrating certain embodiments of the invention. However, instead of such a control transistor also a relay may be used which operates in such a manner that e.g. upon energization thereof a normally closed contact is opened so as to disconnect the direct current converter, or that upon energization of the relay a normally opened contact is closed whereby the feedback winding of a transformer constituting part of the direct current converter is attenuated to such an extent that the oscillation of the oscillatory circuit of the converter is discontinued.

Conventionally a direct current converter used in an electronic photoflash apparatus comprises a rectifier arrangement composed of two individual rectifiers and an additional capacitor so connected as to act as a voltage doubler. It will be shown that in an embodiment of the invention this additional capacitor of said rectifier arrangement may be so connected that it also acts as the auxiliary capacitor mentioned further above by being charged via one of the individual rectifiers by the direct current converter.

This particular arrangement makes it additionally possible to dimension in accordance with the invention the auxiliary capacitor so as to have a capacity of preferably only two µf. which constitutes an additional very significant and important reduction of the cost of the entire photoflash apparatus. This will be understood if one realizes that in this manner one capacitor is saved because one single capacitor acts during the charging or recharging period of the storage capacitor as the additional capacitor of the above-mentioned rectifier arrangement and acts as the above-mentioned auxiliary capacitor during the period of time during which the direct current converter is rendered inoperative. In addition, one of the individual rectifiers which during the charging and discharging period of the storage capacitor is a component of the voltage doubler and which simultaneously takes care of charging the additional capacitor acting as auxiliary capacitor, serves during said period of time for decoupling the discharge circuit of the auxiliary capacitor from the other circuits of the apparatus as will be shown further below.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
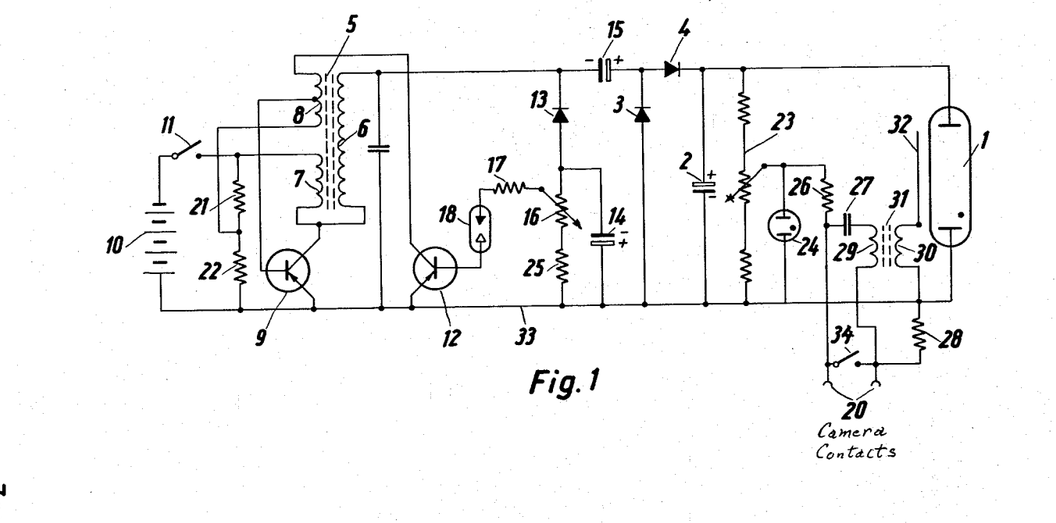
FIG. 1 is a schematic circuit diagram illustrating one embodiment of the invention comprising an auxiliary capacitor which is charged via an independent rectifier, and an additional capacitor constituting part of a voltage doubler.

Referring now to FIG. 1 it can be seen that the illustrated electronic photoflash apparatus according to the invention comprises a gas discharge tube 1 which is supplied in a well known manner with energy from a storage capacitor 2 which may have e.g. a capacity of about 300 µf. This storage capacitor 2 is connected with a low voltage battery 10 via a conventional direct current converter whereby the capacitor 2 may be charged to a potential of about 450 to 500 volts which is suitable for operating the gas discharge tube 1.

The above-mentioned direct current converter consists mainly of a self-oscillating transistor 9, a transformer 5 having a primary winding 7, a feedback winding 8 and a secondary winding 6, and of a rectifier arrangement 3, 4 connected with the secondary of the transformer 5 and cooperating with an additional capacitor 15 so as to constitute a voltage doubler of conventional type.

In view of this voltage doubler arrangement the storage capacitor 2 obtains via the rectifier 4 during each halfwave which is furnished by the secondary 6 with a potential positive relative to the line 33 a positive charge while the negative halfwaves are prevented from reaching and charging the storage capacitor 2 via this rectifier 4. However, the negative halfwaves are used for charging via the rectifier 3 the capacitor 15, the polarity of this charge being indicated in FIG. 1. The next following positive halfwave coming from the secondary 6 cannot pass through the rectifier 3 but the potential of this halfwave is now in series with the potential of the charged capacitor 15 so that now a doubled voltage is available for further charging the storage capacitor 2. This system of voltage doubling is well known in the art.

A voltage divider 21, 22 is connected parallel with the battery 10 and from the tapping point in the center of this voltage divided the base electrode of an oscillating transistor 9 is supplied with a suitable bias voltage via the feedback winding 8. By closing a main switch 11 the direct current converter described above is started to operate. The emitter-collector circuit of the transistor 9 is connected between line 33 i.e. one terminal of the battery and the transformer 5 as illustrated. A high-resistance voltage divided 23 is connected in parallel with the storage capacitor 2, and a variable resistance portion of the voltage divider 23 has a tap connected with an indicating glow lamp 24. The tap and the setting of the variable resistance portion is so chosen that the indicator glow lamp 24 will ignite and emit light as soon as the storage capacitor 2 is charged to a desired predetermined potential. Thus, the indicator lamp 24 indicates in a well known manner that the photoflash apparatus is ready for being used.

Simultaneously with the increase of potential across the glow lamp 24 an igniting capacitor 27 is charged across a series resistor 26, the capacitor 27 being connected via the primary winding 29 of an ignition coil 31 and via a protective resistor 28 with the supply line 33.

It is to be understood that the terminals or contacts 20 may be connected in the well known manner with the corresponding synchronizing contacts of the shutter of a photographic camera. Consequently, whenever by releasing the shutter a connection between the terminals or contacts 20 is established the capacitor 27 is permitted to discharge via the primary winding 29 of the ignition coil and the connected contacts 20. The resulting current pulse generates in the secondary winding 30, which has many more turns than the primary winding 29, a very high voltage of the order of several thousand volts. This high voltage pulse is applied to the igniting electrode 32 of the gas discharge tube 1 whereby the latter is ignited and produces the desired flash.

By means of a switch 34 which may be actuated by a button arranged on the photoflash apparatus it is also possible to ignite the gas discharge tube 1 if this should be desirable e.g. only for testing purposes or when a picture is to be taken in dark surroundings with open shutter. The resistor 28 is only provided for the purpose of protection against electric shocks.

In order to conserve the available energy of the battery 10 a regulator circuit is provided which renders inoperative the direct current converter 10, 9, 5, 15, 3 and 4 as soon as the storage capacitor 2 has reached the desired and predetermined charge potential which may be called its upper critical potential.

The regulator circuit essentially consists of an auxiliary capacitor 14 which is charged via a rectifier 13 which is independent from the above-mentioned rectifier arrangement 3, 4, and also of a glow discharge device 18 and a control transistor 12.

When the direct current converter of the photoflash apparatus is switched on by closing the main switch 11 so that the transistor 9 is in oscillation, the auxiliary capacitor 14 is charged via the independent rectifier 13 substantially in the same manner and to the same degree as the storage capacitor 2 is being charged via the voltage doubler 15, 3, 4.

As gradually the potentials of the two capacitors 2 and 14 increase the situation is bound to occur in which the storage capacitor 2 reaches its upper critical potential so that the direct current converter is rendered inoperative as will be described further below, so that a further charging of the two capacitors 2 and 14 cannot take place any more. This switch-off of the converter is effected at the right moment because a voltage divider comprising a fixed resistor 25 and a variable resistor 16 is connected in parallel with the auxiliary capacitor 14, the variable resistor 16 having a movable tap which is connected via a series resistance 17 with the glow discharge device 18, and because the variable resistor 16 is so set that the glow discharge device 18 ignites exactly at the moment when the upper critical potential of the storage capacitor 2 is reached.

At the moment of ignition of the glow discharge device 18 negative potential is applied to the base of the control transistor 12 so that the previously non-conductive transistor is rendered conductive and by the current flowing through its emitter-collector circuit which is connected in parallel with the feedback winding 8 of the transformer 5 this latter winding 8 is attenuated to such a degree that the self-oscillating transistor 9 cannot continue to oscillate and that therefore the direct current converter is rendered inoperative. The resistor 22 has a comparatively low resistance.

The direct current converter now remains in inoperative condition for a period of time which lasts until the auxiliary capacitor 14 has discharged to approximately the extinction potential of the glow discharge device 18. When this condition is reached the glow discharge device 18 becomes non-conductive so that now the feedback winding 8 is no longer attenuated and the transistor 9 re-starts oscillation. The discharge circuit of the auxiliary capacitor 14 consists mainly of the upper portion of the variable resistor 16, a series resistor 17, the internal resistance of the glow discharge device 18 and the resistance of the emitter-base circuit of the control transistor 12, while the comparatively very highly resistive resistor 25 plays no significant role in the discharge of the capacitor 14.

In accordance with the invention the glow discharge device 18 is made up by a device as mentioned further above whose extinction potential is lower than one-half of its characteristic igniting potential. For instance, in the case of a particularly well suited device of this kind known as voltage surge limited A1–A350 the characteristic igniting potential amounts to about 350 volts and the characteristic extinction potential amounts to about 70 volts. In this case the auxiliary capacitor 14 is preferably chosen to have a capacity of only two µf.

In spite of the comparatively very small capacity of the auxiliary capacitor 14 the time period of the inoperativeness of the direct current converter is sufficiently long because the potential of the auxiliary capacitor 14 has to drop 280 volts until it reaches the extinction potential of the glow discharge device 18.

Now it will be understood that when the glow discharge device 18 after the drop of potential of the auxiliary capacitor 14 to the value of the extinction potential of the device 18 is extinguished the discharge circuit 16, 17, 18 and 12 becomes de-energized, the negative potential at the base of the control transistor 12 disappears, the feedback winding 8 is not anymore attenuated via the emitter-collector path of the transistor 12 and the transformer 5 will start again to furnish the required alternating voltage from its secondary 6.

Now follows a period during which the storage capacitor 2 is re-charged via the voltage doubler 3, 4, 15 while at the same time also the auxiliary capacitor 14 is recharged via the independent rectifier 13. This charging will occur not only in order to make up for losses of potential due to leakages but also whenever the storage capacitor 2 has been discharged by energizing the gas discharge tube 1 i.e. after every flash. The period of re-charging lasts until the potential at the auxiliary capacitor 14 has reached again approximately the value of the ignition potential of the glow discharge device 18 at which moment the latter would ignite and cause the control transistor 12 in the manner described above to render inoperative the direct current converter by attenuation of the feedback winding 8. In this manner periods of non-operativeness of the converter and periods of re-charging the capacitors follow each other alternatingly.

The duration of the period of time during which the converter is non-operative is determined by a time constant of the discharge circuit of the auxiliary capacitor 14 comprising the components 16, 17, 18 and 12, said time constant corresponding to the difference between the igniting and extinction potentials of the glow discharge device 18. A discharge through other portions of the circuit arrangement cannot take place because the independent rectifier 13 has its anode and cathode so connected that it is possible to apply a negative charge to the auxiliary capacitor across the rectifier 13, while thereafter a dissipation of discharge through this rectifier is not possible. The resistor 25 has a very high resistance so that no appreciable discharge current can flow via this portion of the circuit.

Figure 2:
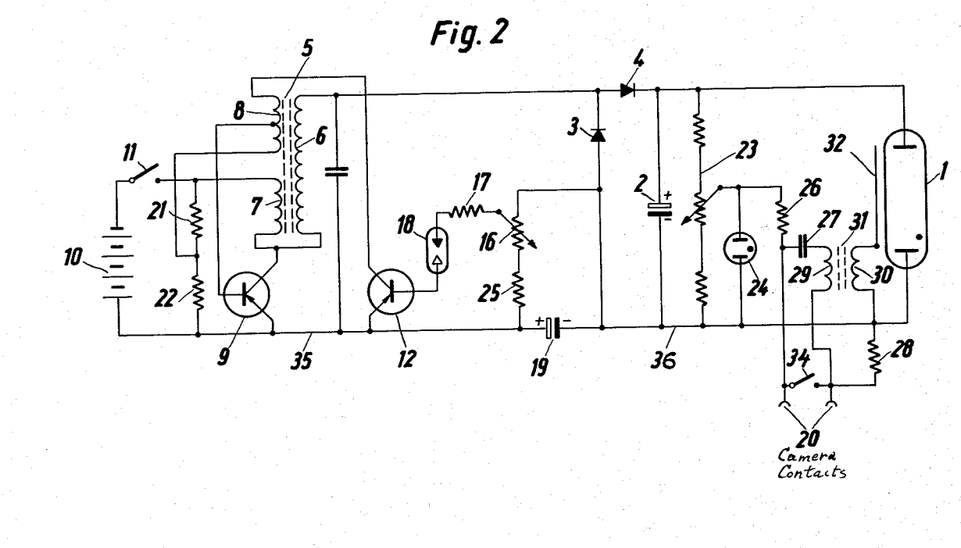
FIG. 2 is a schematic circuit diagram of a modified embodiment of the invention in which one capacitor less and one rectifier less are used because the additional capacitor serves also as auxiliary capacitor and is charged via one of the two rectifiers of the voltage doubler.

Referring now to the modified embodiment according to FIG. 2, it can be seen that the two rectifiers 3 and 4 are arranged substantially in the same manner as in FIG. 1, and these two rectifiers together with the capacitor 19 constitute the voltage doubler. The capacitor 19 of FIG. 2 corresponds to the capacitor 15 of FIG. 1 but it is arranged at a different point of the circuit arrangement namely between the circuit portions 36 and 35.

During each halfwave coming from the secondary 6 and having positive potential relative to the circuit portion 35 the storage capacitor 2 is charged to positive potential via the rectifier 4 while during the negative halfwaves a negative charge cannot reach the storage capacitor via the rectifier 4, but the capacitor 19 is charged via the rectifier 3 with the polarity as indicated in FIG. 2. During the following positive halfwave no current can flow through the rectifier 3 but the potential of such halfwave appears via the transistor 9 in series with the charge of the charged capacitor 19 so that now a doubled voltage is available for further charging the storage capacitor 2. During each positive halfwave coming from the secondary 6 the potential at the storage capacitor 2 is raised a certain amount which additional amount decreases more and more during the charging operation. In the same manner also the charge at the capacitor 19 is gradually increased.

This latter phenomenon is utilized according to the invention for operating the capacitor 19 according to FIG. 2 so that it serves as the auxiliary capacitor in the regulator circuit i.e. in a similar manner as the auxiliary capacitor 14 in FIG. 1. In this manner one rectifier and one capacitor is saved namely the rectifier 13 and the capacitor 14 of FIG. 1 can be omitted.

In a manner analogous to that which has been described above with reference to FIG. 1, the glow discharge device 18 is ignited when the upper critical potential at the storage capacitor 2 and a corresponding potential at the capacitor 19 acting as auxiliary capacitor is reached, so that now negative potential can be applied via the device 18 to the base of the control transistor 12 whereby as shown above the direct current converter is rendered inoperative.

A high resistance voltage divider 23 is connected in parallel with the storage capacitor 2 and a tap of a variable resistance portion of this voltage divider is connected with a glow lamp 24 which indicates whether and when the photoflash apparatus is in readiness for operation.

Simultaneously with the increase of potential at the glow lamp 24 and igniting capacitor 27 is charged via a resistor 26, the capacitor 27 being connected with the line portion 36 via the primary winding 29 of an ignition coil 31 and a protective resistor 28.

The contacts or terminals 20 and the switch 34 has the same function as described above with reference to FIG. 1 so that the desired photoflash is released from the tube 1 whenever the contacts 20 are conductively connected with each other or the switch 34 is closed.

The advantages of the arrangement according to the invention and exemplified by the embodiments according to FIGS. 1 and 2 have been set forth already in the introductory portion of this specification.

It will be understood that each of the elements described above, or two or more together, may also find a useful application in other types of an electronic photoflash apparatus with a discharge circuit including a gas discharge tube and a storage capacitor dischargeable across the gas discharge tube differing from the types described above.

While the invention has been illustrated and described as embodied in an electronic photoflash apparatus with a discharge circuit including a gas discharge tube and a storage capacitor dischargeable across the gas discharge tube, including a regulator circuit comprising an auxiliary capacitor of comparatively small capacity and a glow discharge device having a characteristic extinction potential lower than one-half of its characteristic igniting potential, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electronic photoflash apparatus with a discharge circuit including a gas discharge tube and a storage capacitor dischargeable across the gas discharge tube, in combination, electric energy supply means including direct current converter means furnishing in response to direct current energization an alternating voltage of predetermined elevated amplitude for charging the storage capacitor and comprising an oscillatory circuit with at least one controlling circuit portion therein for producing said alternating voltage depending upon the operativeness of said controlling circuit portion; and regulator circuit means for automatically interrupting the alternating voltage output of said direct current converter means when said storage capacitor is charged to a predetermined potential and including auxiliary capacitor means connected with said direct current converter means for being charged thereby simultaneously with but independently from said storage capacitor, and discharge circuit means connected with said auxiliary capacitor means and including means for rendering said discharge circuit means conductive only when said auxiliary capacitor means is charged to a predetermined potential, said discharge circuit means being also operatively connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativeness of said converter means.

2. An apparatus as claimed in claim 1, wherein voltage divider means having a movable tap is connected in parallel with said auxiliary capacitor means, said tap and a portion of said voltage divider means being connected as part of said discharge circuit means.

3. An apparatus as claimed in claim 2, a series resistor being connected in series with said tap and said means for rendering said discharge circuit means conductive.

4. In an electronic photoflash apparatus with a discharge circuit including a gas discharge tube and a storage capacitor dischargeable across the gas discharge tube, in combination, electric energy supply means including direct current converter means furnishing in response to direct current energization an alternating voltage of predetermined elevated amplitude for charging the storage capacitor and comprising an oscillatory circuit with at least one controlling circuit portion therein for producing said alternating voltage depending upon the operativeness of said controlling circuit portion; and regulator circuit means for automatically interrupting the alternating voltage output of said direct current converter means when said storage capacitor is charged to a predetermined potential and including auxiliary capacitor means connected with said direct current converter means for being charged thereby simultaneously with but independently from said storage capacitor, and discharge circuit means connected with said auxiliary capacitor means and including a glow discharge device having a characteristic extinction potential lower than one-half of its characteristic igniting potential and connected for rendering said discharge circuit means conductive by its being ignited only when said auxiliary capacitor means is charged to said igniting potential, said discharge circuit means being also operatively connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativeness of said converter means.

5. An apparatus as claimed in claim 4, wherein the difference between said igniting potential and said extinction potential of said glow discharge device is the determining factor for a time constant of said discharge circuit means chosen to predetermine a desired time interval between start of inoperativeness of said controlling circuit portion and thus of said converter means, on one hand, and the re-starting of the operativeness of said circuit portion and thus of said converter means.

6. An apparatus as claimed in claim 4, wherein voltage divider means having a movable tap is connected in parallel with said auxiliary capacitor means, said tap and a portion of said voltage divider means being connected as part of said discharge circuit means in series with said glow discharge device.

7. An apparatus as claimed in claim 6, a series resistor being connected in series with said tap and said glow discharge device.

8. In an electronic photoflash apparatus with a discharge circuit including a gas discharge tube and a storage capacitor dischargeable across the gas discharge tube, in combination, electric energy supply means including direct current converter means furnishing in response to direct current energization an alternating voltage of predetermined elevated amplitude for charging the storage capacitor and comprising an oscillatory circuit with at least one controlling circuit portion therein for producing said alternating voltage depending upon the operativeness of said controlling circuit portion; and regulator circuit means for automatically interrupting the alternating voltage output of said direct current converter means when said storage capacitor is charged to a predetermined potential and including auxiliary capacitor means having a capacity of up to ten µf. connected with said direct current converter means for being charged thereby simultaneously with but independently from said storage capacitor, and discharge circuit means connected with said auxiliary capacitor means and including a glow discharge device having a characteristic extinction potential lower than one-half of its characteristic igniting potential and connected for rendering said discharge circuit means conductive by its being ignited only when said auxiliary capacitor means is charged to said igniting potential, said discharge circuit means being also operatively connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativness of said converter means.

9. In an electronic photoflash apparatus with a discharge circuit including a gas discharge tube and a storage capacitor dischargeable across the gas discharge tube, in combination, electric energy supply means including direct current converter means furnishing in response to direct current energization an alternating voltage of predetermined elevated amplitude for charging the storage capacitor and comprising an oscillatory circuit with at least one controlling circuit portion therein for producing said alternating voltage depending upon the operativeness of said controlling circuit portion; and regulator circuit means for automatically interrupting the alternating voltage output of said direct current converter means when said storage capacitor is charged to a predetermined potential and including auxiliary capacitor means having a capacity of up to five µf. connected with said direct current converter means for being charged thereby simultaneously with but independently from said storage capacitor, and discharge circuit means connected with said auxiliary capacitor means and including a glow discharge device having a characteristic extinction potential about one quarter of its characteristic igniting potential and connected for rendering said discharge circuit means conductive by its being ignited only when said auxiliary capacitor means is charged to said igniting potential, said discharge circuit means being also operatively connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativeness of said converter means.

10. In an electronic photoflash apparatus with a discharge circuit including a gas discharge tube and a storage capacitor dischargeable across the gas discharge tube, in combination, electric energy means including direct current converter means furnishing in response to direct current energization an alternating voltage of predetermined elevated amplitude for charging the storage capacitor and comprising an oscillatory circuit with at least one controlling circuit portion therein for producing said alternating voltage depending upon the operativeness of said controlling circuit portion; and regulator circuit means for automatically interrupting the alternating voltage output of said direct current converter means when said storage capacitor is charged to a predetermined potential and including auxiliary capacitor means having a capacity of about two µf. connected with said direct current converter means for being charged thereby simultaneously with but independently from said storage capacitor, and discharge circuit means connected with said auxiliary capacitor means and including a glow discharge device having a characteristic extinction potential of about 70 volts and a characteristic igniting potential of about 350 volts and connected for rendering said discharge circuit means conductive by its being ignited only when said auxiliary capacitor means is charged to said igniting potential, said discharge circuit means being also operatively connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativeness of said converter means.

11. In an electric photoflash apparatus with a discharge circuit including a gas discharge tube and a storage capacitor dischargeable across the gas discharge tube, in combination, electric energy supply means including direct current converter means furnishing in response to direct current energization an alternating voltage of predetermined elevated amplitude for charging the storage capacitor and comprising an oscillatory circuit with at least one controlling circuit portion therein for producing said alternating voltage depending upon the operativeness of said controlling circuit portion; and regulator circuit means for automatically interrupting the alternating voltage output of said direct current converter means when said storage capacitor is charged to a predetermined potential and including auxiliary capacitor means having a capacity of up to ten µf. connected with said direct current converter means for being charged thereby simultaneously with but indepedently from said storage capacitor, and discharge circuit means connected with said auxiliary capacitor means and including a glow discharge device having a characteristic extinction potential lower than one-half of its characteristic igniting potential and transistor means having its base connected in series with said glow discharge device for rendering said discharge circuit means conductive by its being ignited and by thereby rendering said transistor means conductive only when said auxiliary capacitor means is charged to said igniting potentials, the emitter-collector circuit of said transistor means being connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativeness of said converter means.

12. In an electronic photoflash apparatus with a discharge circuit including a gas discharge tube and a storage capacitor dischargeable across the gas discharge tube, in combination, electric energy supply means including direct current converter means furnishing in response to direct current energization an alternating voltage of predetermined elevated amplitude for charging the storage capacitor and comprising an oscillatory circuit with at least one controlling circuit portion therein for producing said alternating voltage depending upon the operativeness of said controlling circuit portion; and regulator circuit means for automatically interrupting the alternating voltage output of said direct current converter means when said storage capacitor is charged to a predetermined potential and including auxiliary capacitor means having a capacity of about 2 µf. connected with said direct current converter means for being charged thereby simultaneously with but independently from said storage capacitor, and discharge circuit means connected with said auxiliary capacitor means and including a glow discharge device having a characteristic extinction potential of about 70 volts and a characteristic igniting potential of about 350 volts and transistor means having its base connected in series with said glow discharge device for rendering said discharge circuit means conductive by its being ignited and by thereby rendering said transistor means conductive only when said auxiliary capacitor means is charged to said igniting potential, the emitter-collector circuit of said transistor means being connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativeness of said converter means.

13. In an electronic photoflash apparatus with a discharge circuit including a gas discharge tube and a storage capacitor dischargeable across the gas discharge tube, in combination, electric energy supply means including direct current converter means furnishing in response to direct current energization an alternating voltage of predetermined elevated amplitude for charging the storage capacitor and comprising an oscillatory circuit with at least one feedback controlling circuit portion therein for producing said alternating voltage depending upon the operativeness of said controlling circuit portion; and regulator circuit means for automatically interrupting the alternating voltage output of said direct current converter means when said storage capacitor is charged to a predetermined potential and including auxiliary capacitor means having a capacitor of up to ten $\mu$f. connected with said direct current converter means for being charged thereby simultaneously with but independently from said storage capacitor, and discharge circuit means connected with said auxiliary capacitor means and including a glow discharge device having a characteristic extinction potential lower than one-half of its characteristic igniting potential and normally non-conductive transistor means having its base connected in series with said glow discharge device for rendering said discharge circuit means conductive by its being ignited and by thereby rendering said transistor means conductive only when said auxiliary capacitor means is charged to said igniting potential, the emitter-collector circuit of said transistor means being connected in parallel with said feedback controlling circuit portion of said direct current converter means and rendering said feedback controlling circuit portion inoperative by attenuation thereof as long as a discharge of said auxiliary capacitor means down to a predetermined minimum potential through said discharge circuit means takes place, and restarting automatically thereafter the operativeness of said converter means.

14. In an electronic photoflash apparatus with a discharge circuit including a gas discharge tube and a storage capacitor dischargeable across the gas discharge tube, in combination, electric energy supply means including direct current converter means furnishing in response to direct current energization an alternating voltage of predetermined elevated amplitude for charging the storage capacitor and comprising an oscillatory circuit with at least one feedback controlling circuit portion therein for producing said alternating voltage depending upon the operativeness of said controlling circuit portion; and regulator circuit means for automatically interrupting the alternating voltage output of said direct current converter means when said storage capacitor is charged to a predetermined potential and including auxiliary capacitor means having a capacity of about 2 $\mu$f. connected with said direct current converter means for being charged thereby simultaneously with but independently from said storage capacitor, and discharge circuit means connected with said auxiliary capacitor means and including a glow discharge device having a characteristic extinction potential of about 70 volts and a characteristic igniting potential of about 350 volts and normally non-conductive transistor means having its base connected in series with said glow discharge device for rendering said discharge circuit means conductive by its being ignited and by thereby rendering said transistor means conductive only when said auxiliary capacitor means is charged to said igniting potential, the emitter-collector circuit of said transistor means being connected in parallel with said feedback controlling circuit portion of said direct current converter means and rendering said feedback controlling circuit portion inoperative by attenuation thereof as long as a discharge of said auxiliary capacitor means down to a predetermined minimum potential through said discharge circuit means takes place, and restarting automatically thereafter the operativeness of said converter means.

15. In an electronic photoflash apparatus with a discharge circuit including a gas discharge tube and a storage capacitor dischargeable across the gas discharge tube, in combination, electric energy supply means including direct current converter means furnishing in response to direct current energization an alternating voltage of predetermined elevated amplitude for charging the storage capacitor and comprising an oscillatory circuit with at least one controlling circuit portion therein for producing said alternating voltage depending upon the operativeness of said controlling circuit portion, said electric energy supply means comprising voltage doubler means including one rectifier means in series with one output of said direct current converter means, capacitance means in series with one output of said direct current converter means, and a second rectifier means connected across the outputs of said direct current rectifier means; and regulator circuit means for automatically interrupting the alternating voltage output of said direct current converter means when said storage capacitor is charged to a predetermined potential and including auxiliary capacitor means connected with said direct current converter means for being charged thereby simultaneously with but independently from said storage capacitor, and discharge circuit means connected with said auxiliary capacitor means and including means for rendering said discharge circuit means conductive only when said auxiliary capacitor means is charged to a predetermined potential, said discharge circuit means being also operatively connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativeness of said converter means.

16. In an electronic photoflash apparatus with a discharge circuit including a gas discharge tube and a storage capacitor dischargeable across the gas discharge tube, in combination, electric energy supply means including direct current converter means furnishing in response to direct current energization an alternating voltage of predetermined elevated amplitude for charging the storage capacitor and comprising an oscillatory circuit with at least one controlling circuit portion therein for producing said alternating voltage depending upon the operativeness of said controlling circuit portion, said electric energy supply means comprising voltage doubler means including one rectifier means in series with one output of said direct current converter means, auxiliary capacitor means in series with the other output of said direct current converter means, and a second rectifier means connected across the outputs of said direct current rectifier means; and regulator circuit means for automatically interrupting the alternating voltage output of said direct current converter means when said storage capacitor is charged to a predetermined potential, said auxiliary capacitor means being connected with said direct current converter means via said second rectifier means for being charged simultaneously with but independently from said storage capacitor, and discharge circuit means connected with said auxiliary capacitor means and including means for rendering said discharge circuit means conductive only when said auxiliary capacitor means is charged to a predetermined potential, said discharge circuit means being also operatively connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativeness of said converter means.

17. In an electronic photoflash apparatus with a discharge circuit including a gas discharge tube and a storage capacitor dischargeable across the gas discarge tube, in combination, electric energy supply means including direct current converter means furnishing in response to direct current energization an alternating voltage of predetermined elevated amplitude for charging the storage capacitor and comprising an oscillatory circuit with at least one controlling circuit portion therein for producing said alternating voltage depending upon the operativeness of said controlling circuit portion, said electric energy supply means comprising voltage doubler means including one rectifier means in series with one output of said direct current converter means, auxiliary capacitor means in series with the other output of said direct current converter means, and a second rectifier means connected across the outputs of said direct current rectifier means; and regulator circuit means for automatically interrupting the alternating voltage output of said direct current converter means when said storage capacitor is charged to a predetermined potential, said auxiliary capacitor means having a capacity of up to ten $\mu$f. and being connected with said direct current converter means via said second rectifier means for being charged simultaneously with but independently from said storage capacitor, and discharge circuit means connected with said auxiliary capacitor means and including means for rendering said discharge circuit means conductive only when said auxiliary capacitor means is charged to a predetermined potential, said discharge circuit means being also operatively connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativeness of said converter means.

18. In an electronic photoflash apparatus with a discharge circuit including a gas discharge tube and a storage capacitor dischargeable across the gas discharge tube, in combination, electric energy supply means including direct current converter means furnishing in response to direct current energization an alternating voltage of predetermined elevated amplitude for charging the storage capacitor and comprising an oscillatory circuit with at least one controlling circuit portion therein for producing said alternating voltage depending upon the operativeness of said controlling circuit portion, said electric energy supply means comprising voltage doubler means including one rectifier means in series with one output of said direct current converter means, auxiliary capacitor means in series with the other output of said direct current converter means, and a second rectifier means connected across the outputs of said direct current rectifier means; and regulator circuits means for automatically interrupting the alternating voltage output of said direct current converter means when said storage capacitor is charged to a predetermined potential, said auxiliary capacitor means having a capacitory of up to five $\mu$f. and being connected with said direct current converter means via said second rectifier means for being charged simultaneously with but independently from said storage capacitor, and discharge circuit means connected with said auxiliary capacitor means and including means for rendering said discharge circuit means conductive only when said auxiliary capacitor means is charged to a predetermined potential, said discharge circuit means being also operatively connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativeness of said converter means.

19. In an electronic photoflash apparatus with a discharge circuit including a gas discharge tube and a storage capacitor dischargeable across the gas discharge tube, in combination, electric energy supply means including direct current converter means furnishing in response to direct curent energization an alternating voltage of predetermined elevated amplitude for charging the storage capacitor and comprising an oscillatory circuit with at least one controlling circuit portion therein for producing said alternating voltage depending upon the operativeness of said controlling circuit portion, said electric energy supply means comprising voltage doubler means including one rectifier means in series with one output of said direct current converter means, capacitance means in series with one output of said direct current converter means, and a second rectifier means connected across the outputs of said direct current rectifier means; and regulator circuit means for automaticaly interrupting the alternating voltage output of said direct current converter means when said storage capacitor is charged to a predetermined potential and including auxiliary capacitor means connected with said direct current converter means for being charged thereby simultaneously with but independently from said storage capacitor, and discharge circuit means connected with said auxiliary capacitor means and including a glow discharge device having a characteristic extinction potential lower than one-half of its characteristic igniting potential and connected for rendering said discharge circuit means conductive by its being ignited only when said auxiliary capacitor means is charged to said igniting potential, said discharge circuit means being also operatively connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativeness of said converter means.

20. In an electronic photoflash apparatus with a discharge circuit including a gas discharge tube and a storage capacitor dischargeable across the gas discharge tube, in combination, electric energy supply means including direct current converter means furnishing in response to direct current energization an alternating voltage of predetermined elevated amplitude for charging the storage capacitor and comprising an oscillatory circuit with at least one controlling circuit portion therein for producing said alternating voltage depending upon the operativeness of said controlling circuit portion, said electric energy supply means comprising voltage doubler means including one rectifier means in series with one output of said direct current converter means, auxiliary capacitor means in series with the other output of said direct current converter means, and a second rectifier means connected across the outputs of said direct current rectifier means; and regulator circuit means for automatically interrupting the alternating voltage output of said direct current converter means when said storage capacitor is charged to a predetermined potential, said auxiliary capacitor means being connected with said direct current converter means via said second rectifier means for being charged simultaneously with but independently from said storage capacitor, and discharge circuit means connected with said auxiliary capacitor means and including a glow discharge device having a characteristic extinction potential lower than one-half of its characteristic igniting potential and connected for rendering said discharge circuit means conductive by its being ignited only when said auxiliary capacitor means is charged to said igniting potential, said discharge circuit means being also operatively connected with said controlling circuit portion of said direct current converter means and rendering said controlling circuit portion inoperative as long as a discharge of said auxiliary capacitor means down to a predetermined minimum potential through said discharge circuit means takes place, and restarting automatically thereafter the operativeness of said converter means.

References Cited by the Examiner

UNITED STATES PATENTS

| | | | |
|---|---|---|---|
| 2,944,191 | 7/1960 | Kapteyn | 315—183 |
| 3,098,947 | 7/1963 | Flieder | 315—183 |
| 3,115,594 | 12/1963 | Mallory | 315—219 |
| 3,162,786 | 12/1964 | Kapteyn | 315—241 |

BERNARD KONICK, *Primary Examiner.*

IRVING L. SRAGOW, *Examiner.*

R. J. GARBACIK, G. LIEBERSTEIN,
*Assistant Examiners.*